UNITED STATES PATENT OFFICE.

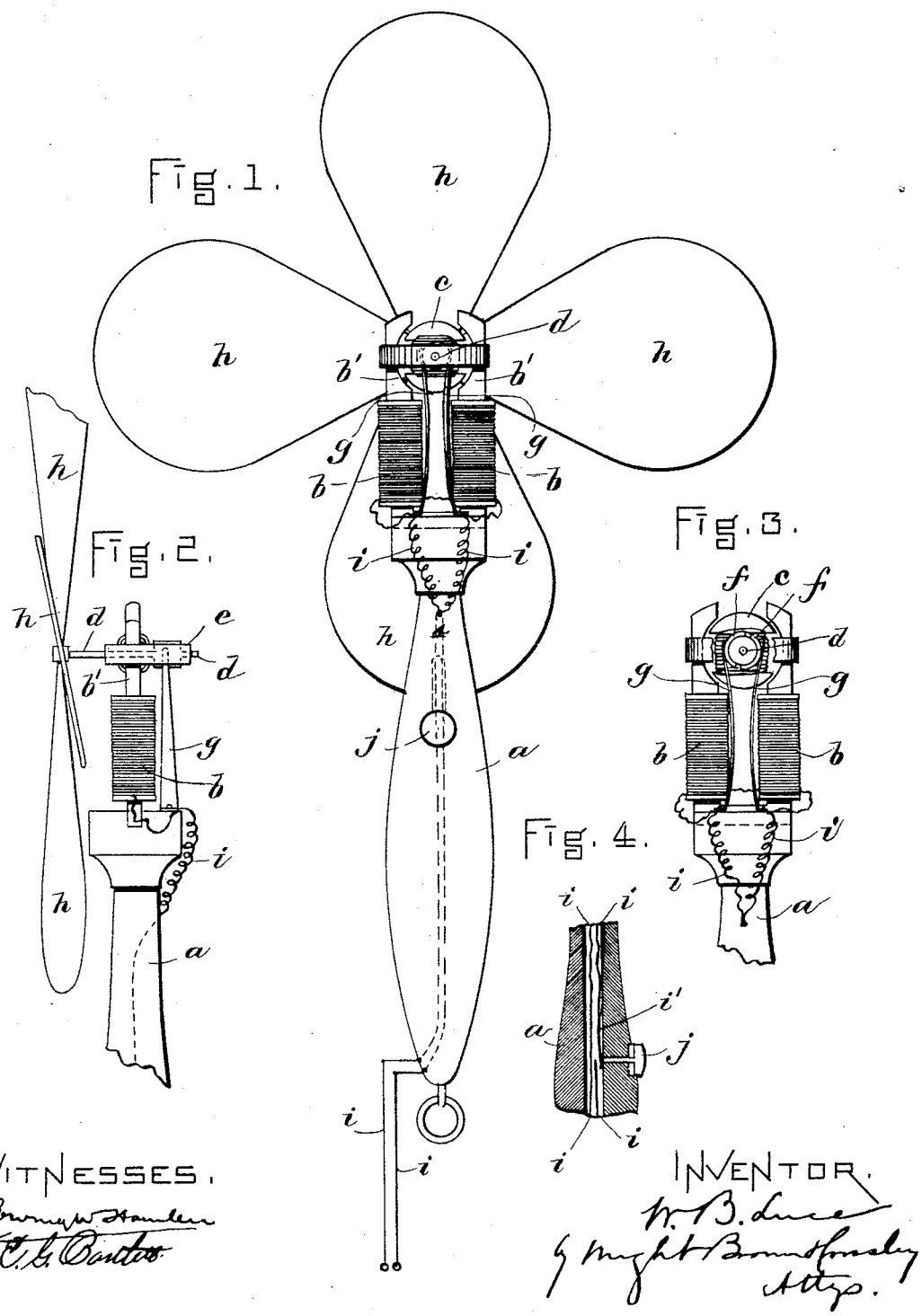

WILLIAM B. LUCE, OF BOSTON, MASSACHUSETTS.

ELECTRIC HAND-FAN.

SPECIFICATION forming part of Letters Patent No. 457,127, dated August 4, 1891.

Application filed May 19, 1890. Serial No. 352,428. (No model.)

*To all whom it may concern:*

Be it known that I, WILLIAM B. LUCE, of Boston, in the county of Suffolk and State of Massachusetts, have invented certain new and useful Improvements in Electric Hand-Fans, of which the following is a specification.

This invention has for its object to provide a portable fan adapted to be operated by electrical means, thus obviating the necessity of exertion on the part of the user of the fan; and it consists in a fan comprising a handle or holder, a movable fan or series of fan-blades mounted to rotate in bearings on the holder, an electric motor also mounted upon the holder and arranged to rotate the shaft of the fan, suitable connections between said motor and a source of electricity, whereby the motor may be driven, and a circuit closing and breaking device located within or upon the holder, so that the user of the fan may cause the rotary movement thereof to cease at pleasure by the manipulation of a button connected with the circuit closing and breaking device, all of which I will now proceed to describe.

Of the accompanying drawings, forming a part of this specification, Figure 1 represents a side elevation of an electric fan embodying my invention. Fig. 2 represents an edge view of the same, a portion of the fan and a portion of the handle or holder being broken away. Fig. 3 represents a side view of a portion of the fan, parts being broken away to show the commutator device of the motor. Fig. 4 represents a section on line 4 4 of Fig. 1.

The same letters of reference indicate the same parts in all the figures.

In the drawings, $a$ represents a suitable handle or holder formed to be conveniently held in the hand.

$b\ b$ represent an electro-magnet mounted upon one end of the holder and having its poles $b'\ b'$ extended so as to occupy positions on either side of a rotating Siemens armature $c$. The shaft $d$ of said armature is journaled in bearings in a frame or support $e$, and has upon it the two sections $f f$ of a commutator, said sections co-operating with two contact-springs $g\ g$, which are suitably attached to the holder $a$ and bear with a yielding pressure upon the sections $f f$.

The electro-magnet $b$, the rotating armature $c$, and the commutator device above described constitute a well-known form of electric motor, the operation of which is perfectly familiar to all skilled in the art and needs no detailed description.

$h$ represents a fan composed of suitably-formed blades attached to the shaft $d$ and adapted to rotate therewith.

$i\ i$ represent conducting-wires, which are connected with the commutator-springs $g\ g$ and extend through the handle or holder $a$ and from the lower or outer end of the same to a suitable source of electricity, which may be a storage-battery or an incandescent electric-light circuit or any other suitable appliance.

When an electric circuit is closed through the conductors $i\ i$ and the electro-magnet $b\ b$, the motor is operated and rotates the fan, as will be readily understood. To enable the holder of the fan to conveniently control its operation, I make one of the conductors $i$ separable by including in it a spring $i'$, which normally occupies the position shown in Fig. 4, thus breaking the continuity of said conductor. A push-button $j$ is connected to the spring $i'$, said push-button being at the outside of the handle. It will be seen, therefore, that the holder of the fan can, by releasing the push-button $j$, cause the breakage of the circuit and the stopping of the operation of the motor and fan, while by pressing said push-button inwardly the circuit will be closed and the operation of the fan continued as long as the push-button is held to keep the spring $i'$ continuous with the conductor, of which it forms a part.

The portions of the conductors $i\ i$ outside of the handle $a$ will of course be flexible, so that the handle and the fan thereon may be freely moved in any desired direction and to any desired extent.

I do not limit myself to an electric motor of the particular construction here shown, but may employ any suitable electric motor adapted to be supported on a small holder and to operate generally in the manner above indicated.

I claim—

The improved electric fan comprising a handle $a$, formed to be grasped by the hand of the user of the fan, an electric motor mounted on one end of said handle and including a shaft journaled in bearings attached to the handle, fan-blades attached to said shaft, conductors $i\ i$, extending from the motor through the handle, one of said conductors including a contact-spring $i'$, which is normally in position to break the continuity of said conductor, a push knob or handle extending from said spring to the exterior of the handle, whereby the user of the fan while holding the handle can close or break the circuit in which said conductors are included and thereby control the operation of the fan, and flexible prolongations of said conductors outside of the handle adapted to be connected with a suitable source of electrical supply, as set forth.

In testimony whereof I have signed my name to this specification, in the presence of two subscribing witnesses, this 17th day of May, A. D. 1890.

WILLIAM B. LUCE.

Witnesses:
C. F. BROWN,
A. D. HARRISON.